Oct. 15, 1963     I. M. KELLEY     3,106,885
AGING VATS
Filed Feb. 14, 1962

INVENTOR.
IRVIN M. KELLEY
BY *Morse + Altman*
ATTORNEYS

United States Patent Office 3,106,885
Patented Oct. 15, 1963

3,106,885
AGING VATS
Irvin M. Kelley, 14 Joy St., Boston, Mass.
Filed Feb. 14, 1962, Ser. No. 173,185
5 Claims. (Cl. 99—277.1)

This invention relates in general to containers for maturing alcoholic beverages and more particularly concerns a unique vat characterized by reusable components and adapted to store whiskey during maturation.

For a great many years it has been the practice for whiskey distillers to age their product in barrels made from thick oak staves. The inner surfaces of these barrels normally are charred to a depth of perhaps one eighth of an inch or so. During maturation, which may take up to eight years or more, the contained whiskey passes into intimate contact with the layer of char which is like activated charcoal and the roughness of the new spirits is removed and the product mellowed.

Because of government regulations pertaining to the production of alcoholic beverages, after the maturation of a batch of whiskey, the barrels may not be used again for the same purpose. This presents a considerable financial problem to the distillers since new barrels are quite expensive to obtain by reason of the coopering involved and by reason of the growing shortage of usable oak. The used barrels have little practical utility and normally are sold for a very small fraction of their original cost.

Accordingly, it is an object of the present invention to provide an improved aging vat for whiskey.

Another object of this invention is to provide an efficient, low cost, whiskey aging vat of which a substantial portion may be repeatedly used for whiskey aging purposes.

Still another object of this invention is to provide a whiskey aging vat which may be fabricated in part from scrap pieces of oak or the like.

More particularly this invention features a whiskey aging vat of generally boxed construction, and having walls which are fabricated in part from a material such as glass, or the like, that is inert to the contained whiskey and in part, from breathable, cellulose panels such as wood, or the like. The outer surfaces of the panels are in contact with the surrounding atmosphere while the inner surfaces are charred and in contact with the whiskey. The cellulose portions of the vat are normally discarded when once used whereas the remaining portion may be reused repeatedly as a frame for fresh wood panels.

Figure 1:
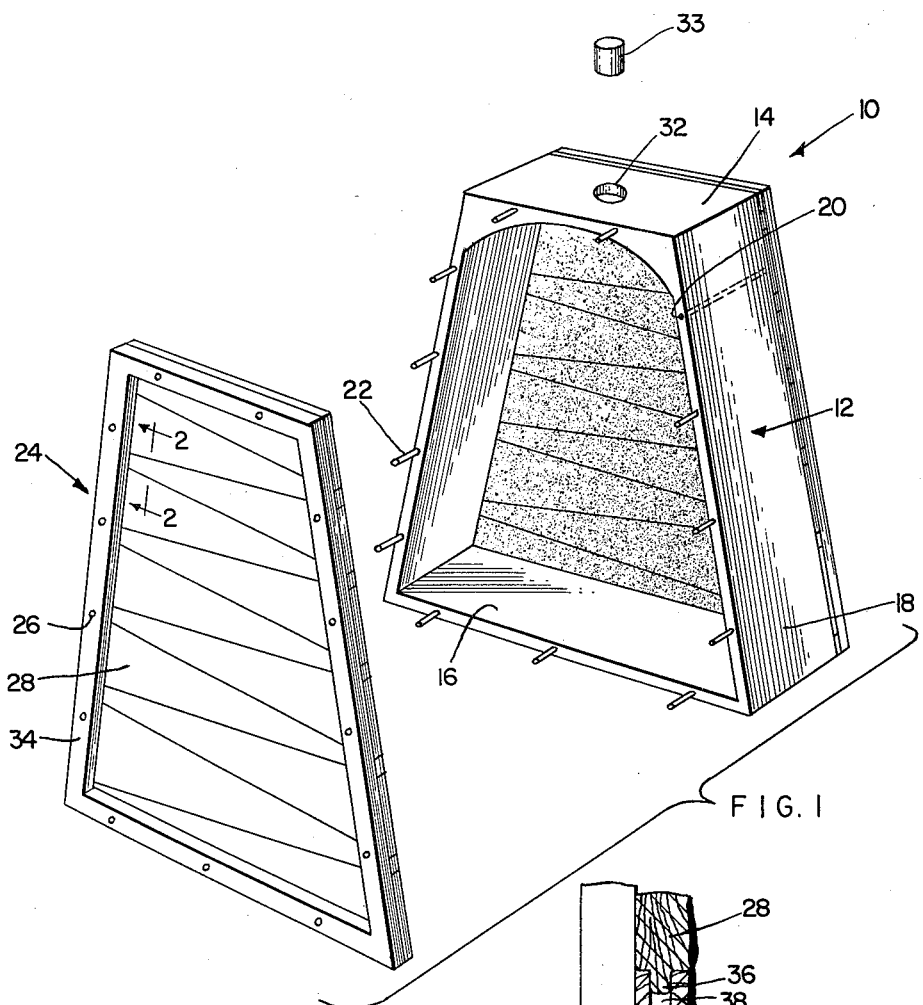
Figure 2:
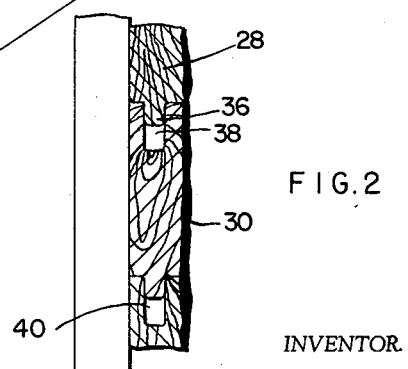

But these and other features of the invention, along with further objects and advantages thereof, will become more readily apparent from the following detailed description of a preferred embodiment of the invention, with reference being made to the accompanying drawings in which:

FIG. 1 is a perspective view, partly exploded, showing a vat made according to the invention, and, FIG. 2 is a cross sectional view taken along the line 2—2 of FIG. 1 and on an enlarged scale.

Referring now to the drawings, the reference character 10 generally indicates a cask or vat for storing and aging a quantity of distilled spirits such as whiskey or the like. The vat is organized about a frame 12 fabricated from a material that is inert with respect to the contained alcohol. Glass or ceramic material, for example, may be used to good advantage in the frame 12 since those materials are structurally strong, may be readily formed by casting, or the like, into the desired configuration and have no effect on the alcohol.

In the illustrated embodiment, the frame 12 is a one piece affair having a flat, relatively small top portion 14, a relatively wide bottom portion 16 and a pair of flat elongated and inclined side portions 18. Preferably the edges on each side of the frame lie in parallel planes with both edges ground to a flat smooth finish. The wide base provided by the tapered configuration of the vat makes the container very stable and, as will presently appear, provides certain other advantages. The interior of the upper end of the frame may be domed to facilitate removal of the liquid contents at the end of the aging period.

The frame 20 is formed with a number of parallel holes 20 which extend through the walls of the frame from one end edge to another as indicated in FIG. 1. These holes accommodate elongated studs 22 which pass through the holes and have their ends projecting from opposite sides of the frame. The studs are provided to mount a pair of end panels 24 to either side of the frame and thereby form a closed container. It will be understood that the ends of the studs will pass through a series of openings 26 arranged about the margins of each panel and engage cooperating nuts (not shown).

The removable end panels 24 are dimensioned to mate evenly over the open ends of the frame 12 and each panel is fabricated from sections of a rigid cellulose material, preferably wood and typically white oak planks. The panels may be assembled from scrap pieces of lumber which have been cut into tapered sections 28, tongued, grooved, and assembled to form the flat panel shown in the drawings. The completed panel has a tapered configuration to conform to the shape of the frame 12 and it will be appreciated that this shape permits the use of small and irregularly sized pieces of wood which could not be used as staves in the conventional all-wooden barrels. It follows then that the cost of the panels will be substantially less than the cost of the staved barrel since the panels are much easier to fabricate and may be made from inexpensive odd pieces of wood.

In practice, the inner surfaces of the panels are charred as at 30 to a depth of perhaps 1/8" or so. This char thus is in contact with the whiskey when the vat is filled as through an opening 32 formed in the top portion 14 of the frame 12. A closure such as a plug 33 is provided for sealing the opening 32. During the aging process the whiskey passes through the layer of char on the inside of the panels and breathes through the wood molecules. The whiskey is mellowed by the char which is like activated charcoal and smooths out the roughness of the spirits.

The quality of the aged whiskey is dependent upon a number of factors including ambient conditions of temperature and humidity, complete and intimate contact of the whiskey with the char and proper breathing of the whiskey through the wood panels. To this end it is desirable to employ a frame 12 which is relatively shallow from front to back so that the panels 24 will be relatively close to one another. This will result in quicker, more efficient maturation than is possible with a conventional barrel since all of the spirits will be closer to the charred surfaces.

In order to reinforce the panels 24, stiff, rigid straps 34 may be mounted about the marginal edges of each panel. These straps may be made of wood, metal or the like and may be made in sections or cast in a single piece.

In FIG. 2 it will be seen that the wood sections 28 are made with mating tongues 36 and grooves 38 for edge to edge engagement and it will be noted that the grooves are relatively deep with respect to the tongues so that a lateral passage 40 is formed between each section. The passage serves as an airway to the side edges of the panels and enhance the breathing characteristics of the panel.

After a batch of spirits has been properly aged it is pumped out either through the top opening 32 or through a suitable opening (not shown) at the base of the vat. The end panels 24 are removed and the frame 12 cleaned for reuse. New panels may then be formed, charred and assembled to the frame 12 and a fresh quantity of alcohol poured in for maturation. For additional savings the panels may be reused by removing the exhausted char by cleaning, reversing the panel and charring what was formerly the outer surface. Certain liquors are aged longer than others and in such cases the panels should be made of correspondingly thicker stock than that used in panels where the maturation process is relatively short.

While the invention has been described with particular reference to the illustrated embodiment, it will be understood that numerous modifications thereto will appear to those skilled in the art. For example, the frame 12 and panels 24 may be made from a variety of materials and in a variety of shapes. Also the panels may be mounted by means other than the studs and vats described. It will therefore be understood that the drawings and descriptions have been made as illustrative of the invention and should not be taken in a limiting sense.

Having thus described my invention, what I claim and desire to obtain by Letters Patent of the United States is:

1. A vat for aging liquor, comprising a multi-walled container adapted to receive a quantity of liquor, at least one of the walls of said container being fabricated from a material that is inert to the liquor and at least another of the walls of said container being fabricated from joined wood sections the inner surfaces of which are charred, said sections being contoured along their connecting edges to define a passage in free communication with the surrounding atmosphere and means for detachably connecting said walls to form a closed vessel.

2. A vat for aging liquor, comprising a tubular frame open at both ends and being of a uniform dimension and configuration from one end thereof to the other, said frame being formed with at least one flat side portion for standing said frame in an upright position, a pair of flat panels detachably mounted over the open ends of said frame to form a vat for containing a quantity of liquor, said frame being formed from a liquid impervious material that is inert to liquor and said panels are formed from a rigid cellulose material the inner surfaces of which are charred.

3. A vat according to claim 2 wherein each of said panels is fabricated from short strips of oak wood joined edge to edge.

4. A vat for aging liquor, comprising a tubular frame open at both ends, one wall of said frame being flat for stabilizing said frame when said frame is disposed in a horizontal position and said flattened wall is at the bottom thereof, a pair of flat panels for closing the open ends of said frame to form a vat for containing a quantity of liquor, means for detachably mounting said panels to said open ends, said frame being formed from a liquid impervious material that is inert to liquor and said panels are formed from strips of oak wood joined edge to edge the inner surfaces of which are charred.

5. A vat according to claim 4 wherein said frame is formed with a plurality of passages extending lengthwise through the walls thereof, a plurality of elongated rods extending through said passages and means at the ends of said rod for securing said panels detachably to said frame.

References Cited in the file of this patent

UNITED STATES PATENTS

| | | |
|---|---|---|
| 2,657,629 | Gibson | Nov. 3, 1953 |
| 2,876,692 | Gaisman | Mar. 10, 1959 |